US011068987B1

(12) United States Patent
Kubera et al.

(10) Patent No.: US 11,068,987 B1
(45) Date of Patent: Jul. 20, 2021

(54) NEXT GENERATION ASSISTANCE

(71) Applicant: Wells Fargo Bank, N.A., San Francisco, CA (US)

(72) Inventors: Jane R. Kubera, San Francisco, CA (US); Jonathan A. Padilla, Fairfield, CA (US); Michael Alan Balsam, San Francisco, CA (US); Nicolette Haacke Frandsen, Walnut Creek, CA (US); Katie Anne Kim, Lafayette, CA (US); Chris Theodore Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 619 days.

(21) Appl. No.: 15/391,698

(22) Filed: Dec. 27, 2016

(51) Int. Cl.
G06Q 40/00 (2012.01)
G06Q 40/06 (2012.01)
G06Q 40/02 (2012.01)

(52) U.S. Cl.
CPC ............. G06Q 40/06 (2013.01); G06Q 40/02 (2013.01)

(58) Field of Classification Search
CPC .............................. G06Q 40/06; G06Q 40/02
USPC ..................................................... 705/35–40
See application file for complete search history.

(56) References Cited

U.S. PATENT DOCUMENTS

| 8,321,310 | B1 | 11/2012 | Keld et al. |
| 8,374,944 | B2 | 2/2013 | Robb |
| 8,459,544 | B2 | 6/2013 | Casey et al. |
| 8,762,275 | B2 | 6/2014 | Martino et al. |
| 9,078,136 | B2 | 7/2015 | Karaoguz et al. |
| 9,406,186 | B2 | 8/2016 | Chapman |
| 10,026,078 | B1 * | 7/2018 | Nolan ................. G06Q 20/3572 |
| 2002/0099659 | A1 | 7/2002 | Swentor |
| 2003/0097331 | A1 * | 5/2003 | Cohen .................... G06Q 20/10 705/39 |
| 2005/0149437 | A1 | 7/2005 | Zellner et al. |

(Continued)

FOREIGN PATENT DOCUMENTS

WO WO-0248973 A2 * 6/2002 ......... H04N 21/4223

OTHER PUBLICATIONS

Honohan: "Cross-country variation in household access to financial services", Journal of Banking and Finance. (Year: 2008).*

Primary Examiner — Edward J Baird
(74) Attorney, Agent, or Firm — Schwegman Lundberg & Woessner, P.A.

(57) ABSTRACT

Various examples are directed to computer-implemented systems and methods for next generation financial account assistance. The method includes receiving a request from a primary account holder to provide a first limited permission for a secondary member to access an account of the primary account holder, and receiving a request from the primary account holder to provide a second limited permission for the secondary member to access the account of the primary account holder, where the second limited permission is activated based on one or more conditions selected by the primary account holder. In various embodiments, the method includes using the first limited permission to provide access to the secondary member to the account of the primary account holder for a first time period, and using the second limited permission to provide access to the secondary member to the account of the primary account holder for a second time period.

19 Claims, 5 Drawing Sheets

(56) References Cited

U.S. PATENT DOCUMENTS

| | | | |
|---|---|---|---|
| 2005/0262016 A1* | 11/2005 | Hill | G06Q 30/00 |
| | | | 705/39 |
| 2006/0282377 A1* | 12/2006 | Edwards | G06Q 40/02 |
| | | | 705/39 |
| 2007/0045395 A1* | 3/2007 | Corona | G06Q 20/10 |
| | | | 235/379 |
| 2011/0047628 A1 | 2/2011 | Viars | |
| 2011/0047629 A1* | 2/2011 | Mitchell | G06F 21/31 |
| | | | 726/28 |
| 2012/0130786 A1* | 5/2012 | Marshall | G06Q 40/02 |
| | | | 705/14.17 |
| 2012/0278881 A1* | 11/2012 | Mann | G06F 21/6218 |
| | | | 726/17 |
| 2014/0012733 A1 | 1/2014 | Vidal | |
| 2014/0080535 A1 | 3/2014 | Gauvreau et al. | |
| 2014/0244463 A1* | 8/2014 | Reimer | G06Q 40/00 |
| | | | 705/35 |
| 2014/0250018 A1 | 9/2014 | Phillips | |
| 2014/0279544 A1* | 9/2014 | Baird | G06Q 20/3278 |
| | | | 705/44 |
| 2016/0112475 A1* | 4/2016 | Lawson | H04L 65/403 |
| | | | 709/204 |
| 2017/0344732 A1* | 11/2017 | Kohli | G06F 21/32 |

\* cited by examiner

NEXT GENERATION ASSISTANCE

TECHNICAL FIELD

Embodiments described herein generally relate to automated financial account management and, for example and without limitation, to systems and methods for secondary member privileges for primary account holder's financial accounts.

BACKGROUND

A primary financial account holder may encounter situations in which it would be desirable for a secondary member, such as a spouse or dependent, to have permission to access and/or update the primary account holder's financial accounts.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

Figure 1:
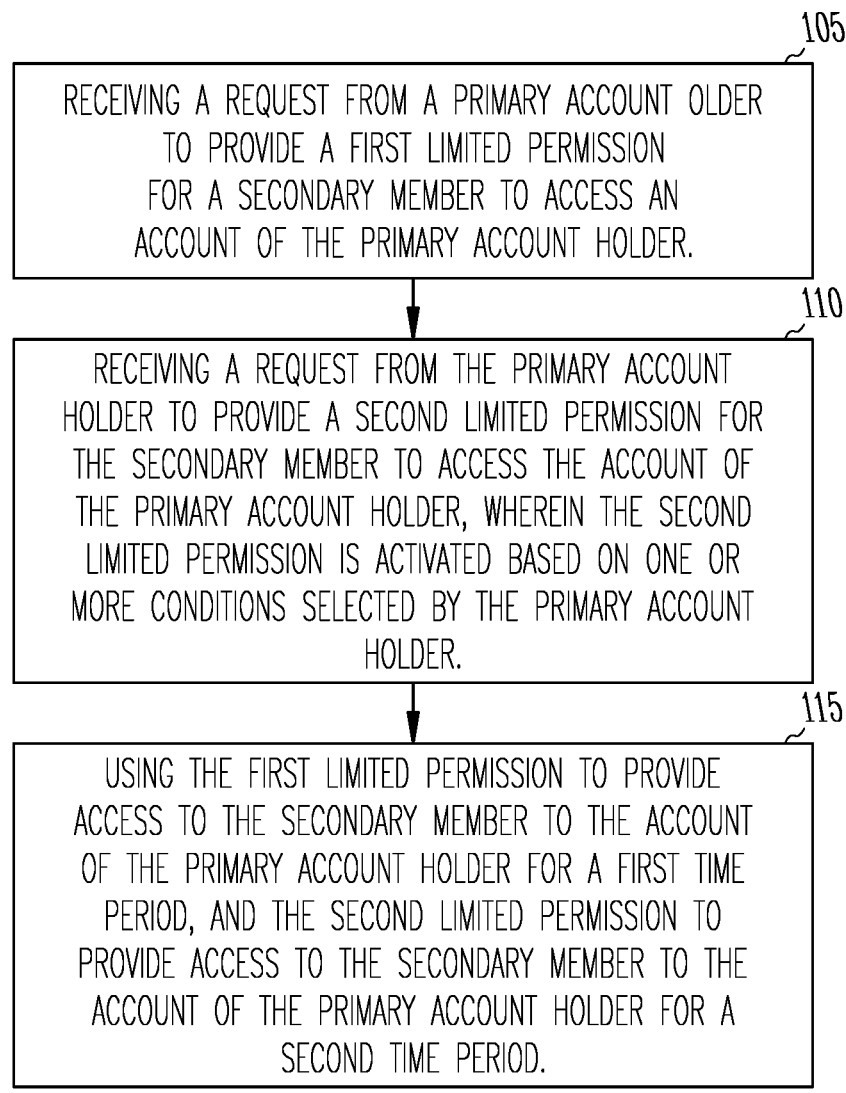
FIG. 1 illustrates a flowchart of an example method of next generation assistance.

A primary financial account holder may encounter situations in which it would be desirable for a secondary member, such as a spouse or dependent, to have permission to access and/or update the primary account holder's financial accounts.

The present subject matter provides a system that enables secondary members (e.g., beneficiary family members) to assist in financial decision-making for a primary account holder (e.g., an older parent, spouse, or non-English speaking client). The system provides limited permissions for the secondary member to execute changes to the primary account holder's accounts, in various embodiments. In various embodiments, this secondary authority enables the secondary member to access some account data, or execute certain decisions relative to the account. The system may escalate through various levels of permission based on certain events (e.g., primary account holder's age, or medical state), giving the secondary more authority as certain conditions are met, in various embodiments.

In an example embodiment, a primary account holder has certain financial positions and accounts with a financial institution. The primary account holder identifies secondary member(s) and configures initial secondary privileges for each member, in an embodiment. The secondary conditions may include view access to account data, the ability to update profile data (e.g., mailing address), and/or the ability to execute trades, pay bills from account, respond to communications, and/or execute downsizing sale of property, purchase of property/housing), in various embodiments. According to various embodiments, the primary account holder can configure levels of privilege and select escalation events. In various embodiments, the escalation events may include the primary account holder reaching certain age and/or retiring, the medical condition of the primary account holder (e.g., hospitalized, surgery, diagnosed with dementia, death), the age of the secondary member, and/or various contingency plans (in case X happens, then Y). Additional conditions may include providing for a language barrier of the primary account holder, including providing co-access to the secondary member as a proxy. The language barrier condition may be triggered by audio capture, in various embodiments. In addition, the primary account holder can select a spouse or dependent as a secondary member, and provide for spousal control, limits on expense/trade, co-agreements to a joint decision (financial or non-financial), and/or select rules set by one or both spouses. In various embodiments, the secondary member may authenticate transactions for the primary account holder.

The financial institution monitors and facilitates the system of the present subject matter. For example, during normal operation, the system allows secondary member to perform tasks for which they are privileged. In addition, the system may monitor for certain events, or may be triggered by third party (e.g., advisor certification, hospital interface, life alerts, voice recognition, and/or payment transactions for certain items), in various embodiments. The system monitors fluctuation in distribution from the primary account holder's accounts, in an embodiment. According to one embodiment, inheritance by the secondary member shifts full control to secondary—secondary(s) become primary(s)—including possible new account openings and automatic asset transfers (e.g., based on system-implemented will). Thus, the present subject matter provides a tiered level of secondary access to a primary account holder's accounts, with escalation events or conditions shifting account access through multiple tiers of privilege, including end-of-life account turnover.

The present subject matter may employ additional data known to the financial institution, in various embodiments. A financial institution may have account holders that use a device to access a website controlled directly or indirectly by the financial institution. The financial institution may capture and retain data with each web interaction. A financial institution may also have users that use an application provided by the financial institution. In this case, the financial institution may capture and retain data during interactions with the customer, upon a schedule, or on demand. In one embodiment, the system provides notifications (to the primary account holder, the secondary member, or both) that certain selected events or conditions have or are about to occur. In various embodiments, the system may automatically open new accounts for the purposes described herein. In one embodiment, pre-selected account limits or spending limits (for the primary account holder, the secondary member, or both) are instituted upon the event or condition.

In various embodiments, the present subject matter may use device data known to a third party data source. A third party may have users that use a device to access a website controlled directly or indirectly by the financial institution. Examples may include an activity or fitness tracker used by the primary account holder, a location tracker such as a global positioning system (GPS), social media accounts of the primary account holder, and/or medical records of the primary account holder. In addition, the primary account holder's accounts can be monitored for hospital or medically related charges, in an embodiment. The third party may capture and retain data with each web interaction. A third party may also have users that use an application provided by the third party. In this case, the third party may capture and retain data during interactions with the customer, upon a schedule, or on demand.

FIG. 1 illustrates a flowchart of an example method of next generation assistance. At method step 105, a request is received from a primary account holder to provide a first limited permission for a secondary member to access an account of the primary account holder. At method step 110, a request is received from the primary account holder to provide a second limited permission for the secondary member to access the account of the primary account holder, wherein the second limited permission is activated based on one or more conditions selected by the primary account holder. At method step 115, the first limited permission is used to provide access to the secondary member to the account of the primary account holder for a first time period, and the second limited permission is used to provide access to the secondary member to the account of the primary account holder for a second time period, according to various embodiments.

In various embodiments, the primary account holder makes a request or entry of first and second permissions (and third and fourth, without limitation), and identifies one or more secondary members in person at a branch location of a financial institution. In an embodiment, the primary account holder makes these requests using a web interface. The primary account holder may enter in an identification of a secondary user and use a drop down menu to select various permissions sets, in one embodiment. Other methods of entering a request or entry can be made electronically without departing from the scope of the present subject matter.

According to various embodiments, at least one of the first level of permission and the second level of permission includes allowing the secondary member to view selected account data for the account of the primary account holder. At least one of the first level of permission and the second level of permission includes allowing the secondary member to update profile data for the account of the primary account holder, in various embodiments. In one embodiment, at least one of the first level of permission and the second level of permission includes allowing the secondary member to execute trades for the account of the primary account holder. At least one of the first level of permission and the second level of permission includes allowing the secondary member to pay bills from the account of the primary account holder, in an embodiment. In one embodiment, the first level of permission includes no access for the secondary member.

In various embodiments, at least one of the first level of permission and the second level of permission includes allowing the secondary member to respond to electronic communications regarding the account of the primary account holder. At least one of the first level of permission and the second level of permission includes allowing the secondary member to sell property related to the account of the primary account holder, in various embodiments. In an embodiment, at least one of the first level of permission and the second level of permission includes allowing the secondary member to purchase property related to the account of the primary account holder. According to various embodiments, the one or more conditions include the primary account holder's age, the primary account holder's medical condition, the primary account holder's employment status, and/or the secondary member's age.

Various embodiments include a system for next generation assistance. The system includes a computing device (for a financial institution, in an embodiment), the computing device comprising at least one processor and a data storage device in communication with the at least one processor, wherein the data storage device comprises instructions thereon that, when executed by the at least one processor, causes the at least one processor to receive, by the at least one processor, a request from a primary account holder to provide a first limited permission for a secondary member to access an account of the primary account holder. The data storage device further comprises instructions thereon that, when executed by the at least one processor, causes the at least one processor to receive, by the at least one processor, a request from the primary account holder to provide a second limited permission for the secondary member to access the account of the primary account holder, wherein the second limited permission is activated based on one or more conditions selected by the primary account holder. In various embodiments, the data storage device also comprises instructions thereon that, when executed by the at least one processor, causes the at least one processor to use, by the at least one processor, the first limited permission to provide access to the secondary member to the account of the primary account holder for a first time period, and the second limited permission to provide access to the secondary member to the account of the primary account holder for a second time period.

Various embodiments include a second condition and a third limited permission, an nth condition and time period, and an (n+1)th limited permission, without limit. According to various embodiments, the one or more conditions include a language barrier of the primary account holder. The language barrier condition is triggered by an audio capture, in an embodiment. In one embodiment, the one or more conditions include an inheritance.

Various embodiments include a non-transitory computer-readable storage medium, the computer-readable storage medium including instructions that when executed by computers, cause the computers to perform operations of receiving a request from a primary account holder to provide a first limited permission for a secondary member to access an account of the primary account holder. A request is received from the primary account holder to provide a second limited permission for the secondary member to access the account of the primary account holder, wherein the second limited permission is activated based on one or more conditions selected by the primary account holder. The first limited permission is used to provide access to the secondary member to the account of the primary account holder for a first time period, and the second limited permission is used to provide access to the secondary member to the account of the primary account holder for a second time period.

According to various embodiments, the one or more conditions include a third party trigger condition. The third party trigger condition includes an input by a certified advisor, in an embodiment. In one embodiment, the third party trigger condition includes an alert from a health care facility or application.

Figure 2:
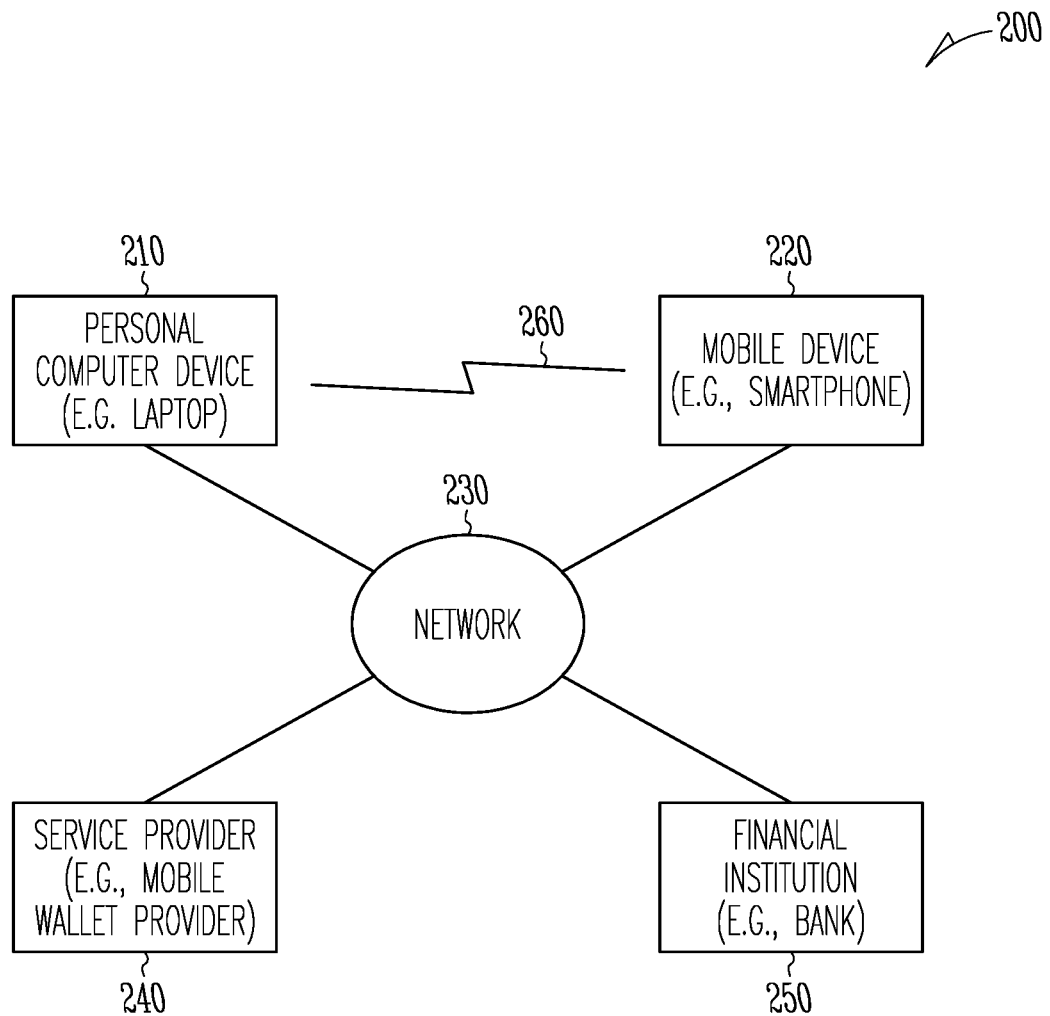
FIG. 2 illustrates an example of a system for next generation assistance.

FIG. 2 illustrates an exemplary infrastructure for providing next generation assistance. The infrastructure comprises a personal computing device (e.g., laptop) 210, a mobile device (e.g., smartphone or wearable device) 220, a service provider 240, and a financial institution 250, a network 230, and a device network 260. The mobile device 220 is a mobile computing device such as smartphone, tablet computer, or other portable computing device. Exemplary mobile devices are Apple iPhone and Samsung Galaxy smartphone. Exemplary service providers are Apple, PayPal, and Samsung. The financial institution 250 is an organization that provides an account for the primary account holder, in various embodiments. Exemplary financial institutions are bank, credit/debit card companies, and the like.

The network 230 represents a virtual network which provides communication between entities 210, 220, 240 and 250. The network 230 can comprise Internet, LAN, Wi-Fi, home network, cellular network, NFC, and other types of networks, in various embodiments. The device network 260 is a wireless communication network between the mobile device 220 and personal computing device only. Exemplary wireless networks 260 are a Local area network (LAN), Personal Area Network (PAN), and body area network (BAN). The wireless network 260 can use Bluetooth, Near Filed Communication (NFC), Wi-Fi, ZigBee, or other wireless technology, in various embodiments.

Figure 3:
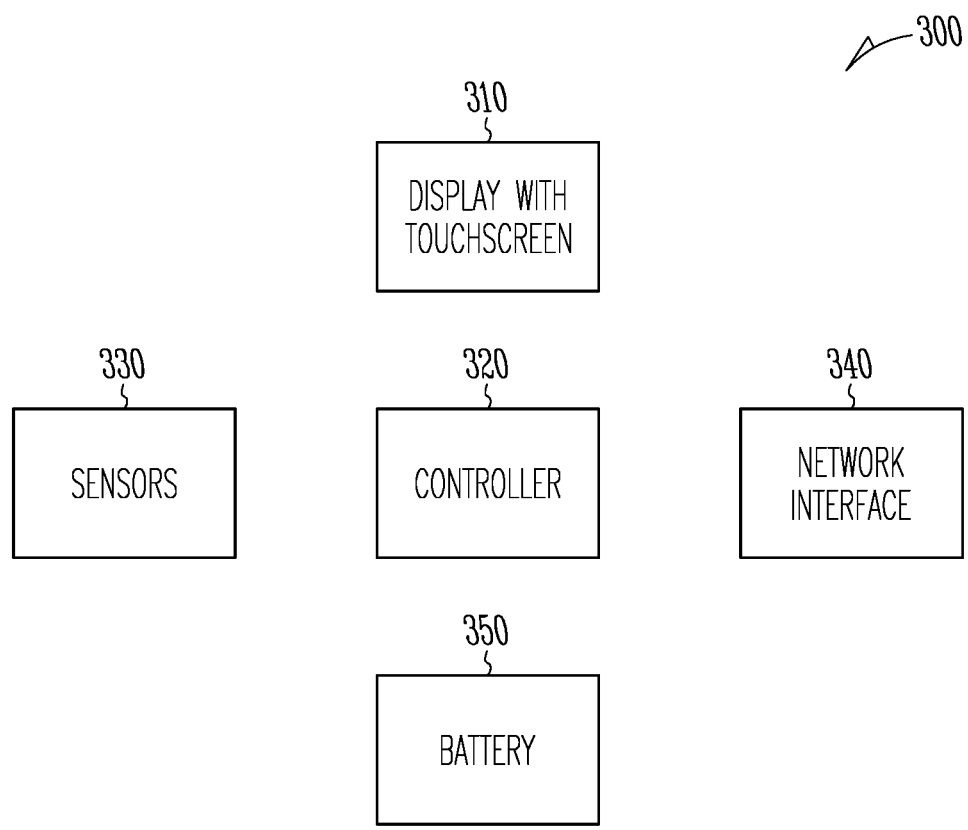
FIG. 3 illustrates an example embodiment of a computing device used by a user for next generation assistance.

FIG. 3 illustrates an embodiment of computing device 300 used by a user to request a transaction that requires authentication. In the depicted embodiment, the computing device 300 includes a display with a touchscreen 310 interfaced with a controller or processor 320. The controller or processor 320 is electrically connected to one or more sensors 330, a network interface 340, and a battery 350 to supply power to the computing device 300, in various embodiments.

Figure 4:
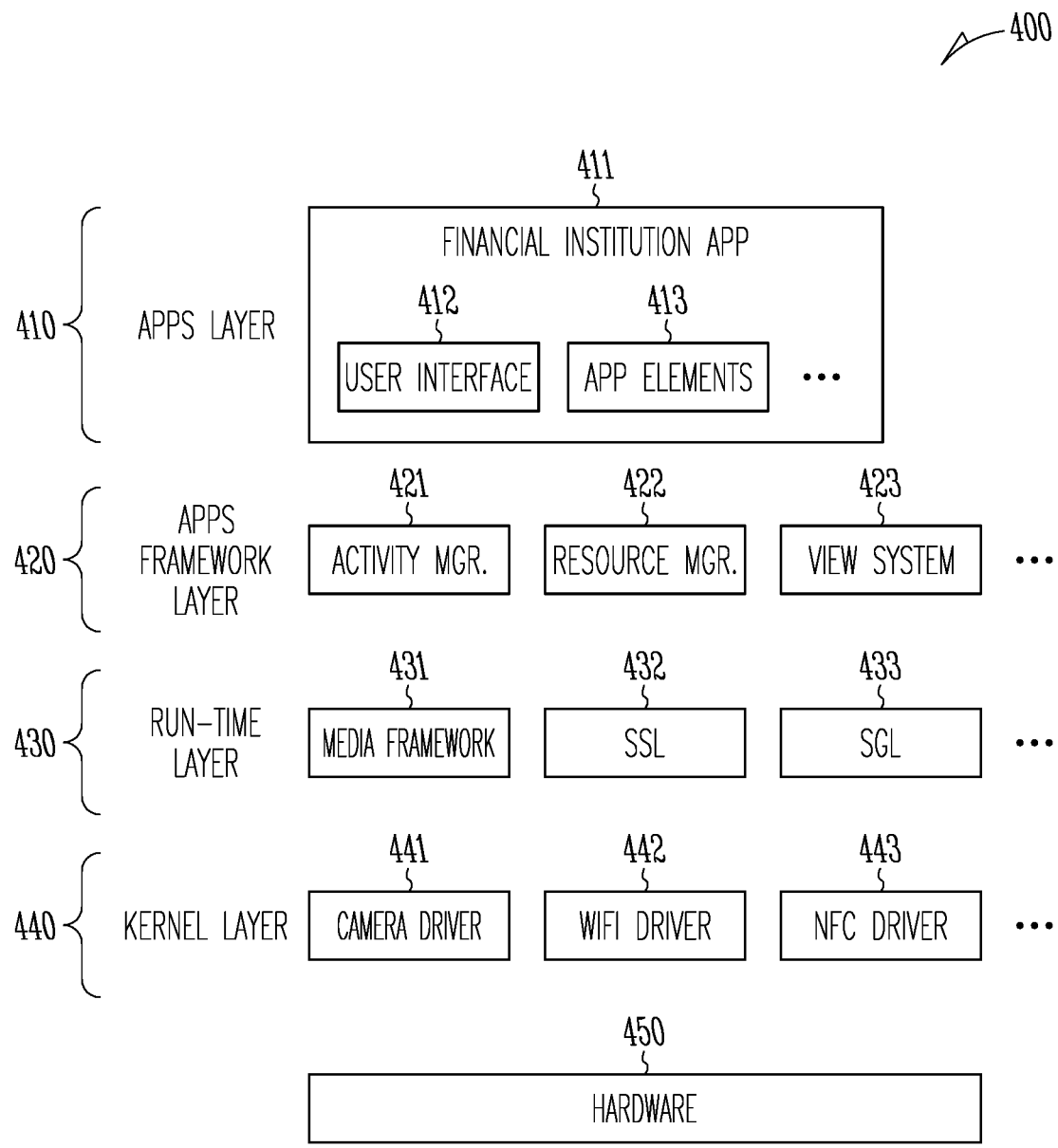
FIG. 4 illustrates an example embodiment of a computing device used for next generation assistance.

FIG. 4 illustrates an embodiment of a computing device 400 with a financial institution application 411. In various embodiments, the computing device 400 includes a mobile computing device such as a cellular telephone or smart phone. The depicted embodiment illustrates one example of software architecture executed on hardware 450, including one or more processors of the computing device 400. FIG. 4 is merely a non-limiting example of a software architecture and many other architectures can be implemented to facilitate the functionality described herein.

The representative hardware 450 comprises one or more processing units having associated executable instructions. Executable instructions represent the executable instructions of the software architecture, including implementation of the methods, modules, and components of the present subject matter. Hardware 450 also includes memory and/or storage modules, which also have executable instructions.

In the example architecture of FIG. 4, the software can be conceptualized as a stack of layers where each layer provides particular functionality. For example, the software can include layers such as an operating system, libraries, frameworks/middleware, applications and presentation layer. Other software architectures can include additional or different layers. The operating system can manage hardware resources and provide common services. The overall system can include, for example, a kernel layer 440, run-time layer 430, application framework layer 420 and application layer 410. The kernel layer 440 can act as an abstraction layer between the hardware and the other software layers. For example, the kernel layer 440 can be responsible for memory management, processor management (e.g., scheduling), component management, networking, security settings, and so on. The drivers can be responsible for controlling or interfacing with the underlying hardware. For instance, the drivers can include display drivers, camera drivers 441, Bluetooth® drivers, flash memory drivers, serial communication drivers (e.g., Universal Serial Bus (USB) drivers), Wi-Fi® drivers 442, near field communication (NFC) drivers 443, audio drivers, power management drivers, and so forth depending on the hardware configuration.

The run-time layer 430 can include a media framework 431, a secure sockets layer (SSL) 432 and a secure group layer (SGL) 433, in various embodiments. The application framework layer 420 can include an activity manager 421, a resource manager 422, and a view system application 423, in various embodiments. The application layer 410 can include built-in applications and/or third party applications. Examples of representative built-in applications can include, but are not limited to, a contacts application, a browser application, a book reader application, a location application, a media application, a messaging application, and/or a game application. Third party applications can include any of the built in applications as well as a broad assortment of other applications. In a specific example, the third party application (e.g., an application developed using the Android™ or iOS™ software development kit (SDK) by an entity other than the vendor of the particular platform) can be mobile software running on a mobile operating system such as iOS™, Android™, Windows® Phone, or other mobile operating systems. In this example, the third party application can invoke application programming interface (API) calls provided by the operating system to facilitate functionality described herein. A financial institution application 411 can implement the functionality of a mobile wallet application, in one embodiment. The mobile wallet application can be a built-in or third party application, and can include a user interface 412 and application elements 413 in various embodiments.

The applications in application layer 410 can utilize built in operating system functions (e.g., kernel, services and/or drivers), libraries, frameworks and middleware to create user interfaces to interact with users of the system. Alternatively, or additionally, in some systems interactions with a user can occur through a presentation layer. In these systems, the application/nodule "logic" can be separated from the aspects of the application/module that interact with a user.

Figure 5:
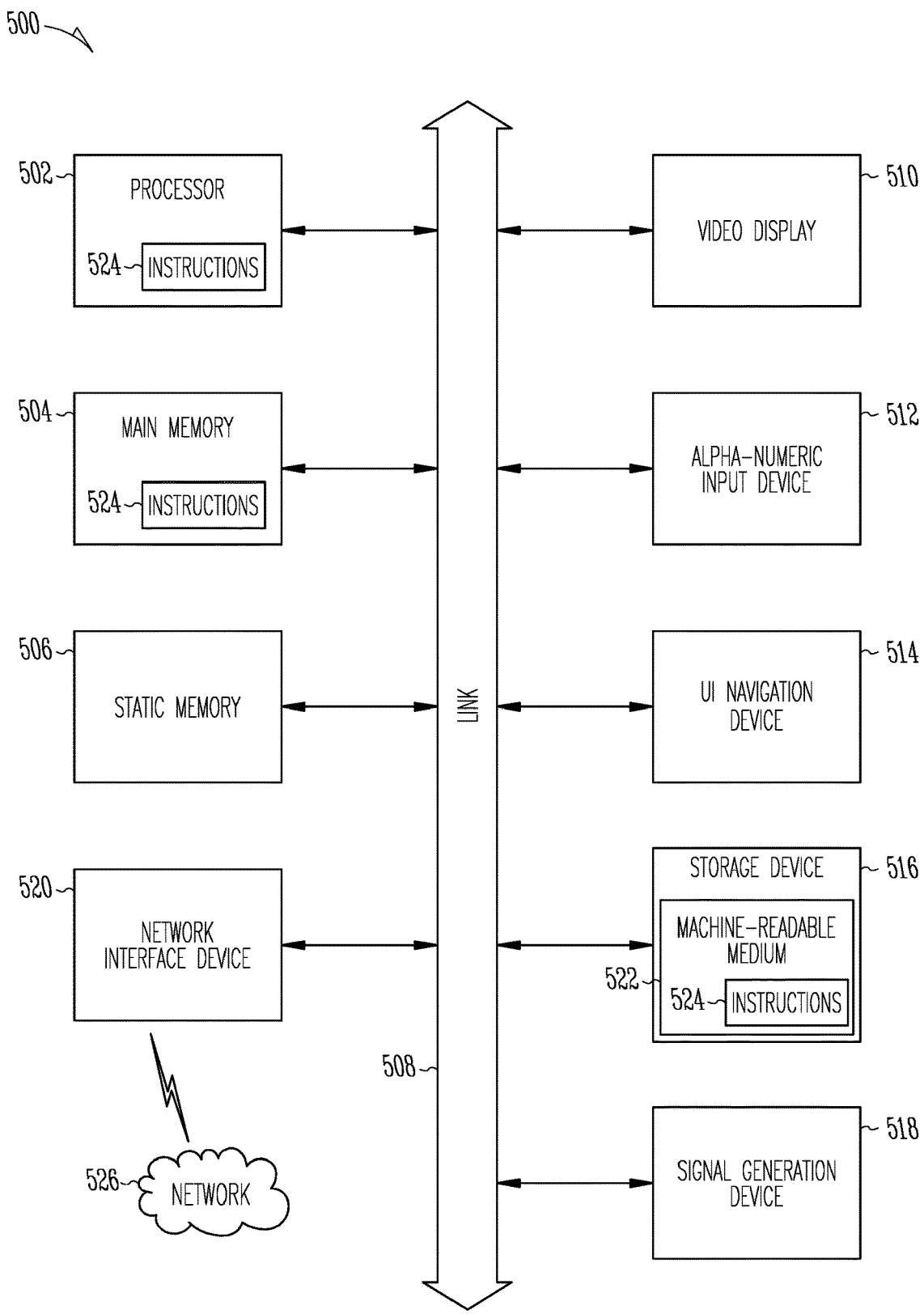
FIG. 5 is a block diagram of a machine in the example form of a computer system within which a set of instructions can be executed, for causing the machine to perform any one or more of the methodologies discussed herein.

FIG. 5 is a block diagram illustrating a machine in the example form of a computer system 500, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile or cellular telephone such as a smart phone, a wearable device such as a smart watch, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 can additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The data storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system 500, with the main memory 504, static memory 506, and the processor 502 also constituting machine-readable media.

While the non-transitory computer-readable storage medium 522 is illustrated in an example embodiment to be a single medium, the term "machine-readable medium" or "computer-readable medium" can include a single medium or multiple media a centralized or distributed database, and/or associated caches and servers) that store the one or more instructions 524. The term "machine-readable medium" shall also be taken to include any tangible medium that is capable of storing, encoding or carrying instructions (e.g., instructions 524) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., 3G, and 6G LTE/LTE-A or WiMAX networks), The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising:
providing, by a processor of a computer, a drop down menu on a graphical user interface, the drop down menu including options for multiple tiers of limited permissions for a secondary member to access an account of a primary account holder;
receiving, by the processor, from the graphical user interface a request from the primary account holder to provide a first limited permission of the multiple tiers selected from the drop down menu for the secondary member to access the account of the primary account holder;
providing, by the processor, the first limited permission to the secondary member;
receiving, by the processor, a request from the primary account holder to provide a second limited permission of the multiple tiers selected from the drop down menu for the secondary member to access the account of the primary account holder;
providing, by the processor, the second limited permission to the secondary member
automatically activating, by the processor, subsequent tiers of limited permissions of the multiple tiers of limited permissions based on one or more escalation events or one or more conditions selected by the primary account holder;
accessing, by the processor, the account of the primary account holder by the secondary member for a first time period based on the first limited permission, wherein a duration of the first time period is determined by satisfaction of at least one of the one or more conditions or the one or more escalation events; and
accessing, by the processor, the account of the primary account holder by the secondary member for a second time period based on the second limited permission, wherein the second time period is determined by satisfaction of at least one of the one or more conditions or the one or more escalation events,
wherein at least one of the first limited permission and the second limited permission includes allowing the secondary member to execute trades for the account of the primary account holder.

2. The method of claim 1, wherein at least one of the first limited permission and the second limited permission includes allowing the secondary member to view selected account data for the account of the primary account holder.

3. The method of claim 1, wherein at least one of the first limited permission and the second limited permission includes allowing the secondary member to update profile data for the account of the primary account holder.

4. The method of claim 1, wherein at least one of the first limited permission and the second limited permission includes allowing the secondary member to pay bills from the account of the primary account holder.

5. The method of claim 1, wherein at least one of the first limited permission and the second limited permission includes allowing the secondary member to respond to communications regarding the account of the primary account holder.

6. The method of claim 1, wherein at least one of the first limited permission and the second limited permission includes allowing the secondary member to sell property related to the account of the primary account holder.

7. The method of claim 1, wherein at least one of the first limited permission and the second limited permission includes allowing the secondary member to purchase property related to the account of the primary account holder.

8. The method of claim 1, wherein the one or more conditions include the primary account holder's age.

9. The method of claim 1, wherein the one or more conditions include a primary account holder's medical condition.

10. The method of claim 1, wherein the one or more conditions include a primary account holder's employment status.

11. The method of claim 1, wherein the one or more conditions include the secondary member's age.

12. A system comprising:
a computing device comprising at least one processor and a data storage device in communication with the at least one processor, wherein the data storage device comprises instructions thereon that, when executed by the at least one processor, causes the at least one processor to:
provide, by the at least one processor, a drop down menu on a graphical user interface, the drop down menu including options for multiple tiers of limited permissions for a secondary member to access an account of a primary account holder;
receive, by the at least one processor, from the graphical user interface a request from the primary account holder to provide a first limited permission of the multiple tiers selected from the drop down menu for the secondary member to access the account of the primary account holder;
provide, by the at least one processor, the first limited permission to the secondary member;
receive, by the at least one processor, a request from the primary account holder to provide a second limited permission of the multiple tiers selected from the drop down menu for the secondary member to access the account of the primary account holder;
provide, by the at least one processor, the second limited permission to the secondary member;
automatically activate, by the at least one processor, subsequent tiers of limited permissions of the multiple tiers of limited permissions based on one or more escalation events or one or more conditions selected by the primary account holder;
access, by the at least one processor, the account of the primary account holder by the secondary member for a first time period based on the first limited permission, wherein a duration of the first time period is determined by satisfaction of at least one of the one or more conditions or the one or more escalation events; and
access, by the at least one processor, the account of the primary account holder by the secondary member for a second time period based on the second limited permission, wherein the second time period is determined by satisfaction of at least one of the one or more conditions or the one or more escalation events,
wherein at least one of the first limited permission and the second limited permission includes allowing the secondary member to execute trades for the account of the primary account holder.

13. The system of claim 12, wherein the one or more conditions include a language barrier of the primary account holder.

14. The system of claim 13, wherein the language barrier condition is triggered by an audio capture.

15. The system of claim 12, wherein the one or more conditions include an inheritance.

16. A non-transitory computer-readable storage medium, the computer-readable storage medium including instructions that when executed by computers, cause the computers to perform operations of:
providing a drop down menu on a graphical user interface, the drop down menu including options for multiple tiers of limited permissions for a secondary member to access an account of a primary account holder;
receiving from the graphical user interface a request from the primary account holder to provide a first limited permission of the multiple tiers selected from the drop down menu for the secondary member to access the account of the primary account holder;
providing the first limited permission to the secondary member;
receiving a request from the primary account holder to provide a second limited permission of the multiple tiers selected from the drop down menu for the secondary member to access the account of the primary account holder;
providing the second limited permission to the secondary member;
automatically activating subsequent tiers of limited permissions of the multiple tiers of limited permissions based on one or more escalation events or one or more conditions selected by the primary account holder;
accessing the account of the primary account holder by the secondary member for a first time period based on the first limited permission, wherein a duration of the first time period is determined by satisfaction of at least one of the one or more conditions or the one or more escalation events; and
accessing the account of the primary account holder by the secondary member for a second time period based on the second limited permission, wherein the second time period is determined by satisfaction of at least one of the one or more conditions or the one or more escalation events,
wherein at least one of the first limited permission and the second limited permission includes allowing the secondary member to execute trades for the account of the primary account holder.

17. The non-transitory computer-readable storage medium of claim 16, wherein the one or more conditions include a third party trigger condition.

18. The non-transitory computer-readable storage medium of claim 17, wherein the third party trigger condition includes an input by a certified advisor.

19. The non-transitory computer-readable storage medium of claim 17, wherein the third party trigger condition includes an alert from a health care facility or application.

* * * * *